Dec. 20, 1949     C. G. RAMBO     2,491,765
RETRACTABLE ANTIGLARE DEVICE
Filed Dec. 22, 1945
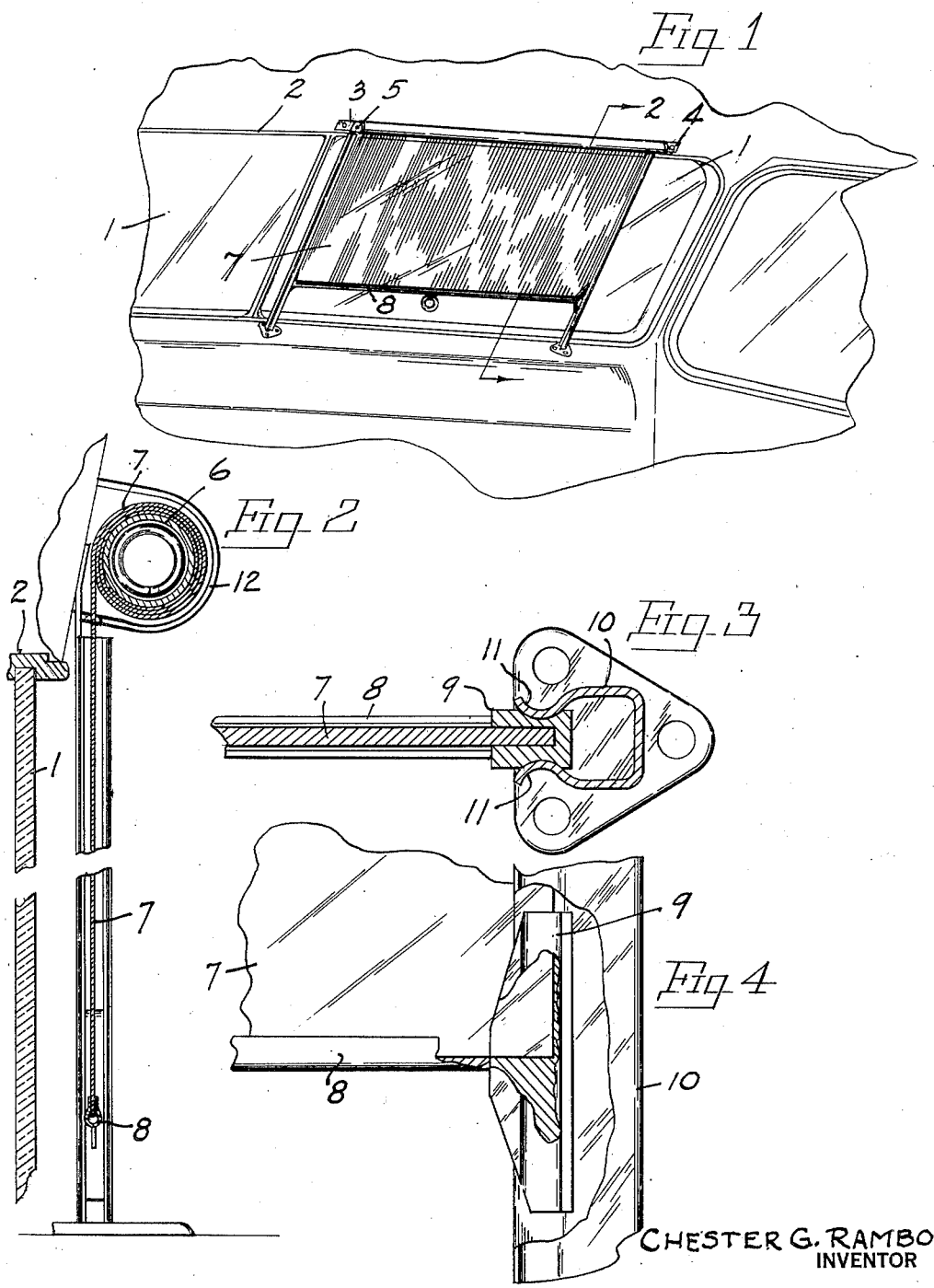
CHESTER G. RAMBO
INVENTOR
BY James D. Givman
ATTORNEY Patented Dec. 20, 1949

2,491,765

UNITED STATES PATENT OFFICE 2,491,765

RETRACTABLE ANTIGLARE DEVICE

Chester G. Rambo, Portland, Oreg.

Application December 22, 1945, Serial No. 636,755

1 Claim. (Cl. 160—267)

This invention relates to improvements in antiglare devices especially adapted for use on automobiles, trucks, motor boats, aircraft and the like.

One of the principal objects of the invention is the provision of a device of this character which is of neat and compact form and adapted to be rolled into a housing disposed in an inconspicuous place on the interior of the vehicle above, below or on either side of the window to which it is applied.

These and other objects will appear as my invention is more fully hereinafter described in the following specification, illustrated in the accompanying drawing and finally pointed out in the appended claim.

In the drawing:

Figure 1 is a fragmentary view of the interior of a vehicle showing a device made in accordance with my invention applied to the windshield of the vehicle.

Figure 2 is an enlarged sectional view taken on the line 2—2 of Figure 1.

Figure 3 is a top plan view of Figure 4.

Figure 4 is an enlarged fragmentary detail view with parts broken away to illustrate underlying parts.

Referring now more particularly to the drawing:

In Figure 1 reference numeral 1 indicates the windshield of a vehicle surrounded by the usual frame 2. Directly above the frame of the windshield I mount brackets 3 and 4 which are apertured as at 5 to receive the ends of the usual spring-actuated curtain roller 6. To the roller 6 I attach one end of a curtain 7 of any desired color and made of light-polarizing material of sufficient thickness to be durable but at the same time flexible enough to wrap compactly around the roller. To the lowermost edge of the curtain I attach a stiffening element in the form of a channel member 8 to stabilize the lower edge of the curtain. The ends of the channel terminate in vertical clips 9 which are also secured to the lower corners of the curtain and are grooved longitudinally as shown to which slide vertically in hollow vertical columns 10 grooved as at 11 throughout their length to frictionally engage the grooves of the clips and to resist their movement as the curtain is raised or lowered, and to hold the same in any desired adjusted position.

It is to be understood that I may provide a slotted housing 12 to embrace the curtain when it is completely wound around the roller to protect it from dust or mutilation.

While I have shown a particular form of embodiment of my invention, I am aware that many minor changes therein will readily suggest themselves to others skilled in the art without departing from the spirit and scope of the invention. Having thus described my invention, what I claim as new and desire to protect by Letters Patent is:

An anti-glare device for vehicles, comprising a pair of vertically disposed channel members secured at their ends above and below the windshield of the vehicle, the sides of the channel members being grooved throughout their length, a spring-actuated roller rotatably mounted across the top of said channel members, a curtain of light-polarizing material having one of its ends attached to the roller and adapted to be rolled therearound, the opposite end of the curtain being provided with a stiffening element terminating at both of its ends in vertical clips grooved on both sides throughout their length and slidably mounted in said vertical channel members by the grooves therein engaging with the grooved sides of said clips.

CHESTER G. RAMBO.

REFERENCES CITED

The following references are of record in the file of this patent:

UNITED STATES PATENTS

| Number | Name | Date |
|---|---|---|
| 1,584,910 | Volker | May 18, 1926 |
| 1,764,880 | Nelson | June 17, 1930 |
| 1,775,275 | Eckardt | Sept. 9, 1930 |
| 1,911,232 | Large | May 30, 1933 |
| 2,237,566 | Land | Apr. 8, 1941 |